United States Patent
Mamaril et al.

(10) Patent No.: US 9,178,605 B2
(45) Date of Patent: Nov. 3, 2015

(54) METHOD AND SYSTEM FOR CONTROLLING A COMMUNICATIONS CARRIER'S POWER SPECTRAL DENSITY (PSD) USING SPREAD SPECTRUM FOR MATCHED SPECTRAL ALLOCATION

(75) Inventors: Cris M. Mamaril, Mesa, AZ (US); Michael Beeler, Jefferson, MD (US); Wallace Davis, Scottsdale, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 577 days.

(21) Appl. No.: 13/406,969

(22) Filed: Feb. 28, 2012

(65) Prior Publication Data
US 2012/0156986 A1 Jun. 21, 2012

Related U.S. Application Data

(60) Provisional application No. 61/578,763, filed on Dec. 21, 2011.

(51) Int. Cl.
*H04B 1/10* (2006.01)
*H04B 1/00* (2006.01)
*H04B 7/00* (2006.01)
*H04B 7/185* (2006.01)

(52) U.S. Cl.
CPC .................................. *H04B 7/18513* (2013.01)

(58) Field of Classification Search
CPC ...................................................... H04B 7/18506
USPC ........................................ 455/522, 69, 127.1
See application file for complete search history.

(56) References Cited

U.S. PATENT DOCUMENTS

| | | | | |
|---|---|---|---|---|
| 7,054,593 B2* | 5/2006 | de La Chapelle | .. | H04B 7/18506 455/12.1 |
| 7,302,226 B2* | 11/2007 | Stephenson | ........ | H04B 7/18591 370/316 |
| 7,630,683 B2* | 12/2009 | de La Chapelle | ............ | 455/13.2 |
| 7,693,191 B2* | 4/2010 | Gorday et al. | ................ | 370/515 |
| 7,756,490 B2* | 7/2010 | Karabinis | .......... | H04B 7/18513 455/12.1 |
| 2003/0137928 A1* | 7/2003 | Kroeger et al. | ................ | 370/206 |
| 2007/0026795 A1 | 2/2007 | De La Chapelle | | |
| 2008/0240166 A1 | 10/2008 | Gorday et al. | | |
| 2009/0191910 A1* | 7/2009 | Athalye et al. | ................ | 455/522 |
| 2011/0269396 A1* | 11/2011 | Beeler et al. | ...................... | 455/9 |

FOREIGN PATENT DOCUMENTS

RU 2172495 C1 8/2001
WO WO 0227975 4/2002

* cited by examiner

*Primary Examiner* — Tilahun B Gesesse
(74) *Attorney, Agent, or Firm* — Booth Udall Fuller, PLC

(57) ABSTRACT

A method of reducing adjacent satellite interference, the method comprising monitoring, by a processor, a power spectral density (PSD) of a signal transmitted by a remote transmitter, determining, by the processor, that the PSD of the signal transmitted by the remote transmitter is above a predetermined level, and reducing the PSD of the signal transmitted by the remote transmitter by adjusting at least one of a spread spectrum spreading factor, a power level, a modulation factor, and a forward error correction (FEC) rate using a modulator while maintaining a constant spectral allocation and center frequency of the signal.

24 Claims, 9 Drawing Sheets

| MODCOD | MODULATION INDEX | FEC RATE | Eb/No | Es/No |
|---|---|---|---|---|
| 0 | 1 (BPSK) | 0.488 | 2.400 | -0.716 |
| 1 | 2 (QPSK) | 0.533 | 2.200 | 2.478 |
| 2 | 2 (QPSK) | 0.631 | 2.800 | 3.811 |
| 3 | 2 (QPSK) | 0.706 | 3.300 | 4.798 |
| 4 | 2 (QPSK) | 0.803 | 3.800 | 5.857 |
| 5 | 3 (8-QAM) | 0.642 | 4.600 | 7.447 |
| 6 | 3 (8-QAM) | 0.711 | 5.200 | 8.490 |
| 7 | 3 (8-QAM) | 0.780 | 5.600 | 9.292 |
| 8 | 4 (16-QAM) | 0.731 | 6.300 | 10.954 |
| 9 | 4 (16-QAM) | 0.780 | 7.000 | 11.942 |
| 10 | 4 (16-QAM) | 0.829 | 7.500 | 12.706 |
| 11 | 4 (16-QAM) | 0.853 | 8.000 | 13.330 |

FIG. 9

METHOD AND SYSTEM FOR CONTROLLING A COMMUNICATIONS CARRIER'S POWER SPECTRAL DENSITY (PSD) USING SPREAD SPECTRUM FOR MATCHED SPECTRAL ALLOCATION

CROSS REFERENCE TO RELATED APPLICATIONS

This document claims the benefit of the filing date of U.S. Provisional Patent Application No. 61/578,763, entitled "A Method and System for Controlling a Communications Carrier's Power Spectral Density (PSD) Using Spread Spectrum for Matched Spectral Allocation" to Cris Mamaril et al., which was filed on Dec. 21, 2011, the disclosure of which is hereby incorporated entirely by reference herein.

BACKGROUND

1. Technical Field

Aspects of this document relate generally to telecommunication systems and techniques for transmitting data across a telecommunication channel.

2. Background Art

In all forms of communications, the objective is to develop smaller antennas that provide higher performance while occupying less space. The natural result of using a smaller antenna is that the beam patterns become wider as the antennas necessitate a less sharply focused signal transmission and the result is energy being received in undesirable locations. The options to mitigate the problem of off-axis emissions are as follows: 1) use a larger antenna, which may not be an option due to space requirements; 2) lower the transmitted power resulting in less overall power being used for the transmission link; or 3) using a combination of decreasing the power while using signal processing techniques such as Forward Error Correction (FEC) or spread spectrum to mitigate the effects of the reduced transmission power or smaller antenna. In the art, the amount of power per unit bandwidth (e.g. Watts/Hz or dBW/Hz) is known as the Power Spectral Density (PSD). For a given amount of power, a smaller antenna emits the power over a wider area, resulting in higher off axis emissions. Conversely, a larger antenna emits the same amount of power with lower off axis emissions.

For example, in satellite communications, as the size of the antenna is reduced, a resulting and negative aspect of the reduction to the size of the antenna aperture is that off-axis emissions increase, resulting in less energy being directed into the bore sight to the intended target receiver or satellite and more energy ending up in the off-axis (not into the bore sight).

Therefore, a need exists for a method and system that addresses communications on the move (COTM) or satellite on the move (SOTM) products in which the antennas are small (small aperture size), resulting in higher adjacent satellite interference (ASI) conditions being experienced due to the wider transmission beam from the antenna. The result is that the PSD may be higher than can be tolerated on the adjacent satellites (off axis emissions).

Development of a method and system that allow a transmission device to operate at an established transmission configuration, but keep the spectral allocation as a constant value (e.g. remaining within the 3 dB bandwidth) is advantageous. Many devices in the art suffer from problems when changing the transmission carrier signal characteristics that result in the symbol rate having to be adjusted. Therefore, a need exists for a method and system that allow a transmission carrier signal's spectral allocation to remain at or near a desired (e.g. 3 dB) bandwidth, but use spread spectrum techniques, namely Direct Sequence Spread Spectrum (DSSS) to effectively lower the PSD by while holding the spectral allocation as a constant value during operation.

SUMMARY

Implementations of a method of reducing adjacent satellite interference may comprise monitoring, by a processor, a power spectral density (PSD) of a signal transmitted by a remote transmitter, determining, by the processor, that the PSD of the signal transmitted by the remote transmitter is above a predetermined level, and reducing the PSD of the signal transmitted by the remote transmitter by adjusting at least one of a spread spectrum spreading factor, a power level, a modulation factor, and a forward error correction (FEC) rate using a modulator while maintaining a constant spectral allocation and center frequency of the signal.

Particular implementations may comprise one or more of the following features. The method may further comprise maintaining a communications link between the remote transmitter and a remote receiver while reducing the PSD of the signal. The method may further comprise applying one or more predetermined timing parameters by the modulator when more than one of the spread spectrum spreading factor, the power level, the modulation factor, and the forward error correction (FEC) rate are adjusted. The method may further comprise interrupting a communications link between the remote transmitter and a remote receiver while reducing the PSD of the signal. The PSD of the signal may be reduced by adjusting only the modulation factor while maintaining a constant spectral allocation and center frequency of the signal. The PSD of the signal may be reduced by adjusting only the FEC rate while maintaining a constant spectral allocation and center frequency of the signal. The PSD of the signal may be reduced by adjusting only the power level while maintaining a constant spectral allocation and center frequency of the signal. The signal transmitted by the remote transmitter may be a non-spread waveform. The method may further comprise transitioning the non-spread waveform to a spread waveform wherein the non-spread waveform and the spread waveform have a same spectral allocation. The PSD of the signal may be reduced by adjusting only the modulation factor while maintaining a constant spectral allocation and center frequency of the signal. The PSD of the signal may be reduced by adjusting only the FEC rate while maintaining a constant spectral allocation and center frequency of the signal. The PSD of the signal may be reduced by adjusting only the power level while maintaining a constant spectral allocation and center frequency of the signal. The method may further comprise applying a spread factor of a type 2^N while transitioning the non-spread waveform to a spread waveform. The method may further comprise applying an integer spreading spread factor while transitioning the non-spread waveform to a spread waveform. The method may further comprise applying a fractional spreading spread factor while transitioning the non-spread waveform to a spread waveform.

Implementations of a system for reducing adjacent satellite interference may comprise a remote transmitter configured to transmit a signal to a remote receiver, a processor configured to monitor a power spectral density (PSD) of the signal transmitted by the remote transmitter and determine that the PSD of the signal transmitted by the remote transmitter is above a predetermined level, and a modulator configured to reduce the PSD of the signal transmitted by the remote transmitter by adjusting at least one of a spread spectrum spreading factor, a power level, a modulation factor, and a forward error correction (FEC) rate while maintaining a constant spectral allocation and center frequency of the signal.

Particular implementations may comprise one or more of the following features. The modulator may be further configured to maintain a communications link between the remote transmitter and the remote receiver while reducing the PSD of the signal. The modulator may be further configured to apply one or more predetermined timing parameters by the modulator when more than one of the spread spectrum spreading factor, the power level, the modulation factor, and the forward error correction (FEC) rate are adjusted. The modulator may be further configured to interrupt a communications link between the remote transmitter and a remote receiver while reducing the PSD of the signal. The modulator may be further configured to reduce the PSD of the signal is by adjusting only the modulation factor while maintaining a constant spectral allocation and center frequency of the signal. The modulator may be further configured to reduce the PSD of the signal by adjusting only the FEC rate while maintaining a constant spectral allocation and center frequency of the signal. The modulator may be further configured to reduce the PSD of the signal by adjusting only the power level while maintaining a constant spectral allocation and center frequency of the signal. The signal transmitted by the remote transmitter may be a non-spread waveform. The modulator may be further configured to transition the non-spread waveform to a spread waveform wherein the non-spread waveform and the spread waveform have a same spectral allocation. The modulator may be further configured to reduce the PSD of the signal by adjusting only the modulation factor while maintaining a constant spectral allocation and center frequency of the signal. The modulator may be further configured to reduce the PSD of the signal by adjusting only the FEC rate while maintaining a constant spectral allocation and center frequency of the signal. The modulator may be further configured to reduce the PSD of the signal by adjusting only the power level while maintaining a constant spectral allocation and center frequency of the signal. The modulator may be further configured to apply a spread factor of a type $2^N$ while transitioning the non-spread waveform to a spread waveform. The modulator may be further configured to apply an integer spreading spread factor while transitioning the non-spread waveform to a spread waveform. The modulator may be further configured to apply a fractional spreading spread factor while transitioning the non-spread waveform to a spread waveform.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

FIG. 9 shows various modulation and FEC coding combinations (MODCOD) versus Eb/No and Es/No.

DESCRIPTION

Figure 1:
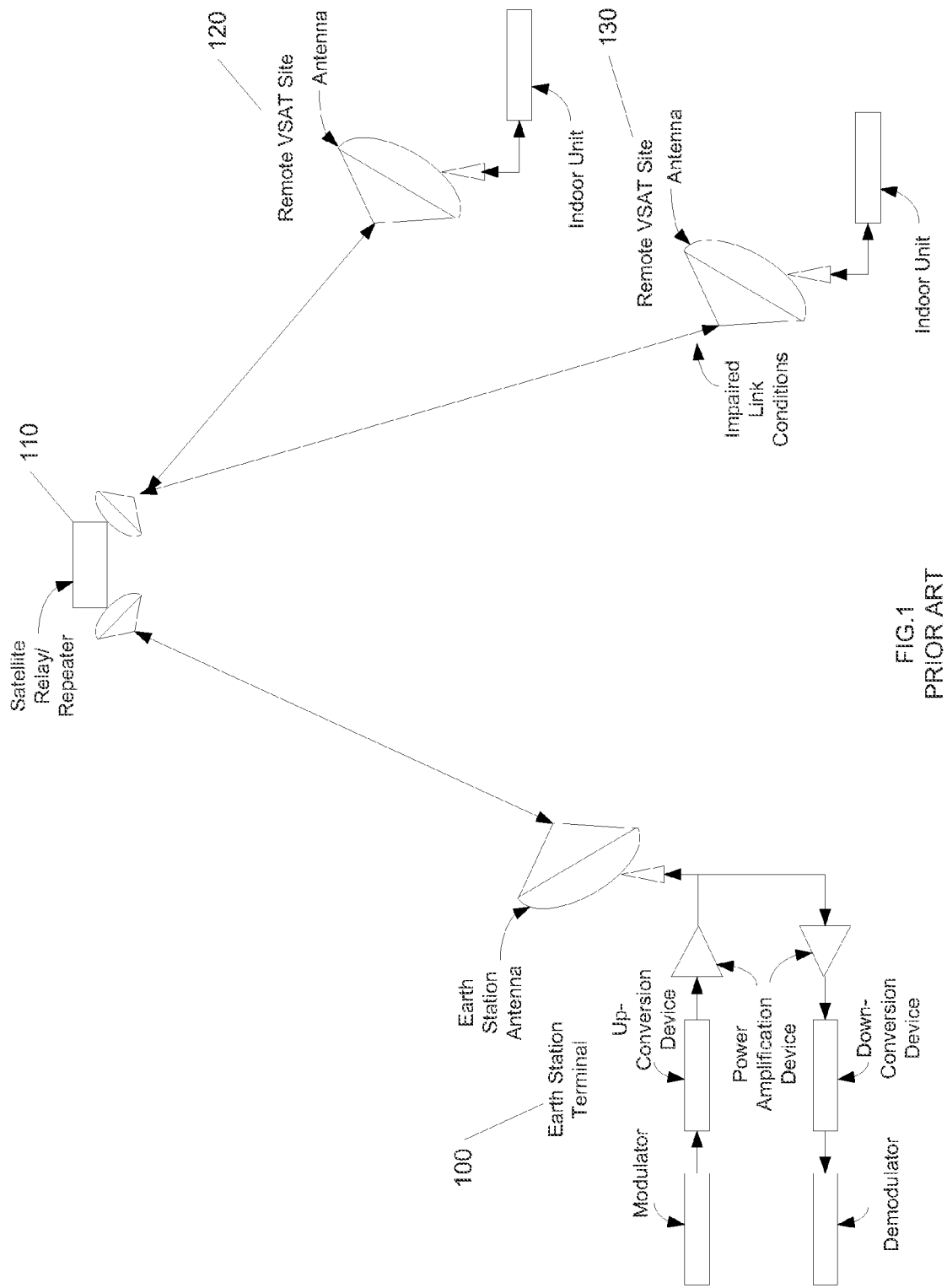
FIG. 1 is a representation of a geographically diverse satellite network with a hub earth station terminal communicating with multiple remote sites.

This disclosure, its aspects and implementations, are not limited to the specific components, frequency examples, or methods disclosed herein. Many additional components and assembly procedures known in the art consistent with a method and system for controlling a communications carrier signal's power spectral density (PSD) using spread spectrum for matched spectral allocation techniques are in use with particular implementations from this disclosure. Accordingly, for example, although particular implementations are disclosed, such implementations and implementing components may comprise any components, models, versions, quantities, and/or the like are known in the art for such systems and implementing components, consistent with the intended operation.

This disclosure relates to a method and system for controlling a communications carrier signal's power spectral density (PSD) using spread spectrum. The method and system provides the user with the ability to control the power spectral density (PSD) by operating the transmission carrier signal at a constant occupied spectral allocation while adjusting the power and spreading factor to ensure the PSD remains at or below an acceptable level. The method and system makes provisions for adjusting the overall carrier signal power, but further compensates by adjusting the spreading while keeping the spectral allocation at a constant value, resulting in the PSD being controlled. An additional aspect of the control is the ability to dynamically adjust the Forwarded Error Correction (FEC) while adjusting the transmission carrier power and level of spreading—in essence the adjustment of the FEC, may be an additional control aspect of lowering the PSD in concert with the level of spreading and power. One result of the described method and system is no interruption to service. Existing art requires service interruption.

The ability to change a system from non-spreading to spreading and then dynamically change the spreading results in a condition at which the power, bandwidth, chip-rate configuration, etc. creates an outage of the system during the change. Particular implementations of the described methods and systems provide a hitless way to ensure the PSD may be managed, that does not result in an impact to the operation of the equipment.

This disclosure relates to a method and system for controlling a communications carrier signal's power spectral density (PSD) using spread spectrum techniques. For point-to-point, point-to-multipoint and multipoint-to-multipoint networks that utilize a repeating relay, such as a space-based satellite repeating relay or an airborne repeating relay, the amount of power spectral density (PSD) that is received by the intended receiver (desired satellite) is beneficial. However, for unintended receivers (adjacent satellites) the higher the PSD, the more interference is received resulting in degradation to services that may be in operation on the adjacent satellite.

In satellite communications, and in the present art, there are numerous ways to ensure the amount of adjacent satellite interference is mitigated. The techniques include, but are not limited to, using a larger antenna to focus the beam into the desired bore sight (desired satellite), using spread spectrum to lower the PSD, using a Forward Error Correction (FEC) code that results in lowering the PSD, or using brute force techniques such as decreasing the transmitted power used for transmitting the carrier signal.

In the art, if it is determined that a transmission site's carrier signal has a PSD that is too high, typically the options for lowering it include: introducing spread spectrum; increasing the occupied spectrum; and/or changing the power emitted from the site. In the present description, implementations of the method and system allow a carrier signal to remain at the original occupied spectral allocation and simply invoke spread spectrum, specifically, in one particular implementation, Direct Sequence Spread Spectrum (DSSS), at the original symbol rate (when operating without spreading). Implementations of the described method and system ensure that the spectral allocation remains as a constant while adjusting the PSD.

More specifically, the introduction of spread spectrum results in the PSD being reduced. For each factor of two (2) for the spreading (spread factor) the power spectral density is reduced by 3 Decibels (3 dB). Therefore, the PSD is reduced by a factor of two for each level of spread factor that is introduced. Holding the occupied spectral allocation to a constant value, equivalent to the non-spread spectrum symbol rate, which is also known in the art as the chip rate, with the introduction of spread spectrum, the power of the carrier signal may be reduced by an equivalent amount of power for each increase of spread factor.

For implementations of the described method and system, with the introduction of spread spectrum, the ability to carry user data is reduced. To compensate for the introduction of spread spectrum, the modulation (MOD) and FEC coding (COD) may be adjusted to provide a more spectral efficient bits/Hz rate to help mitigate the reduction in efficiency of the spread spectrum. The combination of the parameters in implementations of the described methods and systems may result in a hitless manner to minimize the interference as a result of PSD than is available in the existing art.

Particular implementations for a method and system for controlling a communications carrier signal's power spectral density (PSD) using spread spectrum for matched spectral allocation techniques disclosed herein may be specifically employed in satellite communications systems. However, as will be clear to those of ordinary skill in the art from this disclosure, the principles and aspects disclosed herein may readily be applied to any electromagnetic (IF, RF and optical) communications system, such as terrestrial broadcast network without undue experimentation.

The requirement to regulate the PSD has previously been addressed by airborne, satellite and terrestrial antenna manufactures as long as antennas have been produced. Implementations of the described method introduce the ability to provide a hitless (i.e. without link interruption) manner to modify or adjust the waveform/signal/carrier characteristics in a manner that allows the PSD to be controlled. While some implementations of the described system and methods may result in controlling the PSD in a completely or substantially hitless manner, one of ordinary skill in the art would also recognize that other implementations may not be entirely "hitless" when switching from a normalized to a spread configuration.

In the art, the PSD may be addressed in many ways: the most obvious is to change the physical geometry of the antenna by making the aperture larger (larger parabolic aperture or larger surface area with more active elements for a satellite antenna) or longer (longer boom or more elements) for terrestrial, but the geometry is highly dependent on the operating frequency and space available to mount the antenna. A larger physical geometry results in a sharper beam from the antenna. If the geometry cannot be changed or space is limited, then the next step that may be taken is to lower the power spectral density in the waveform by introducing spread spectrum, more FEC to the data, lowering the modulation index, or lowering transmitted power. As each aspect is changed, there is a trade off that must be considered when making changes to the waveform. As power is lowered, more FEC is needed or the modulation index must be lowered. Conversely, if spread spectrum is introduced, then the data rate is reduced. Implementations of the described method and system do affect the bandwidth, but using the aforementioned degrees of freedom, the effects may be adjusted to mitigate the reduction in power, bandwidth, etc. to achieve a level of optimal operation.

FIG. 1 shows a typical satellite configuration having three sites, a hub earth station terminal 100 is communicating over a satellite repeating relay 110 to two geographically diverse remote sites 120, 130.

Figure 2:
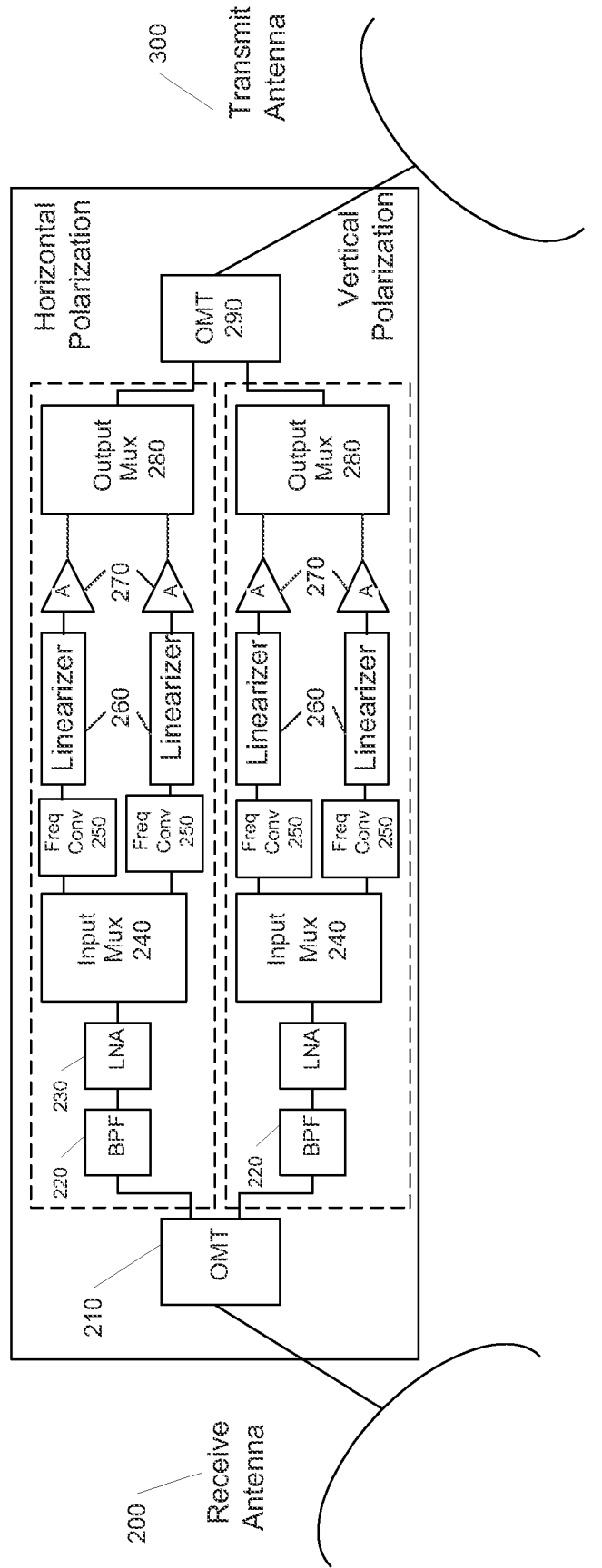
FIG. 2 is a representation of an implementation of a satellite repeating relay.
Figure 3:
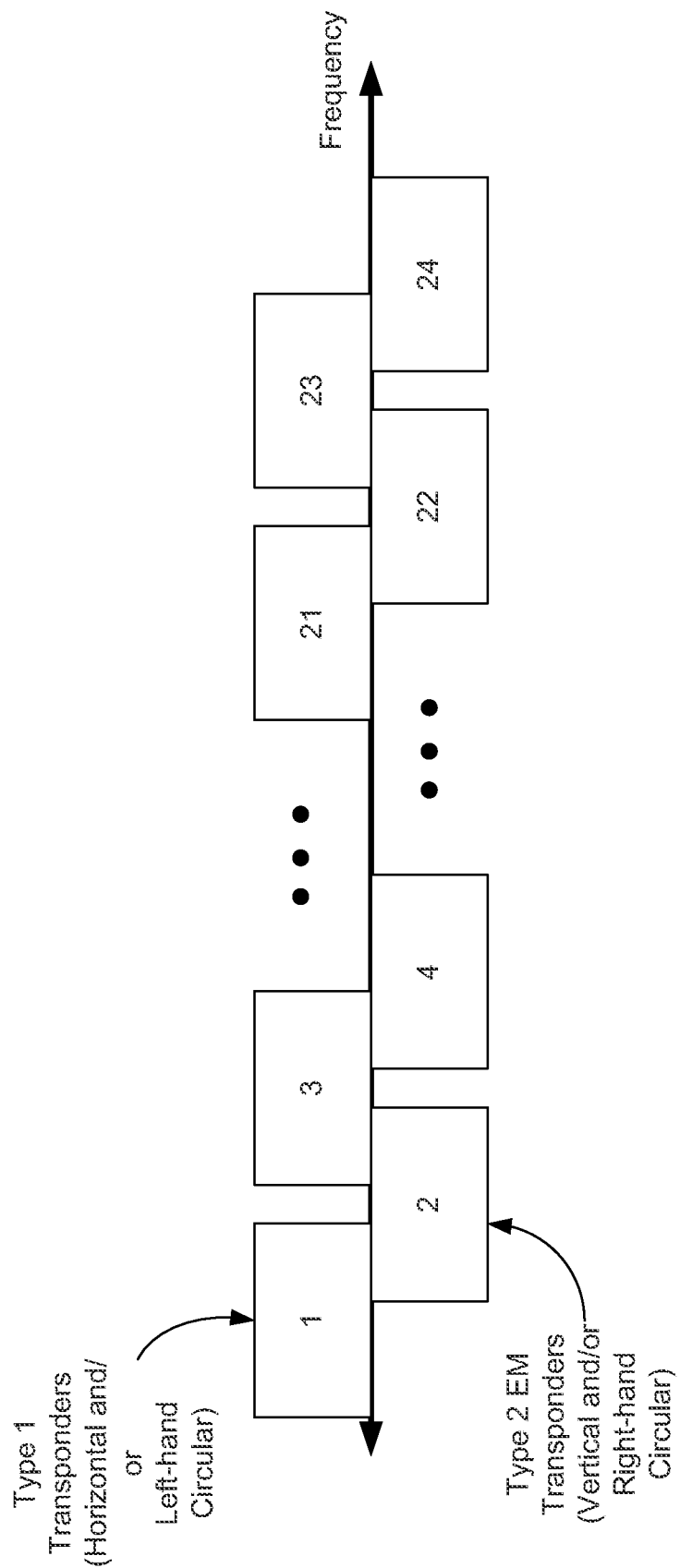
FIG. 3 is a representation showing an implementation of a typical satellite that contains multiple transponders in which the odd transponders are one type of polarization and the even transponders are a second type of polarization.

FIG. 2 illustrates a typical satellite based repeating relay 100 used in the art with no onboard processing. The repeating relay contains an input (receive antenna) 200 which receives the incoming carrier signals, Orthogonal Mode Transducer (OMT) 210 that separates the various electromagnetic (EM) polarizations, Bandpass Filter (BPF) 220 that filters the frequency spectrum, amplifier (e.g. a Low-Noise Amplifier (LNA)) 230 that allows the received carrier signals to be power amplified, multiplexer 240 which separates the various frequency spectrum to the appropriate transponder, frequency converter 250 that converts to the downlink frequency, linearizer 260 that linearizes any non-linearity due to the amplifiers, an amplifier 270 that amplifies before transmitting back to the destination, a multiplexer 280 that multiplexes to the proper EM polarization configuration and feed to the OMT 290 to the transmit antenna 300 feed for relay. The configuration of the transponders of the repeating relay 110 may be comprised of a single transponder or a plurality of EM transponders with or without overlapping frequencies as shown in FIG. 3.

Figure 4:
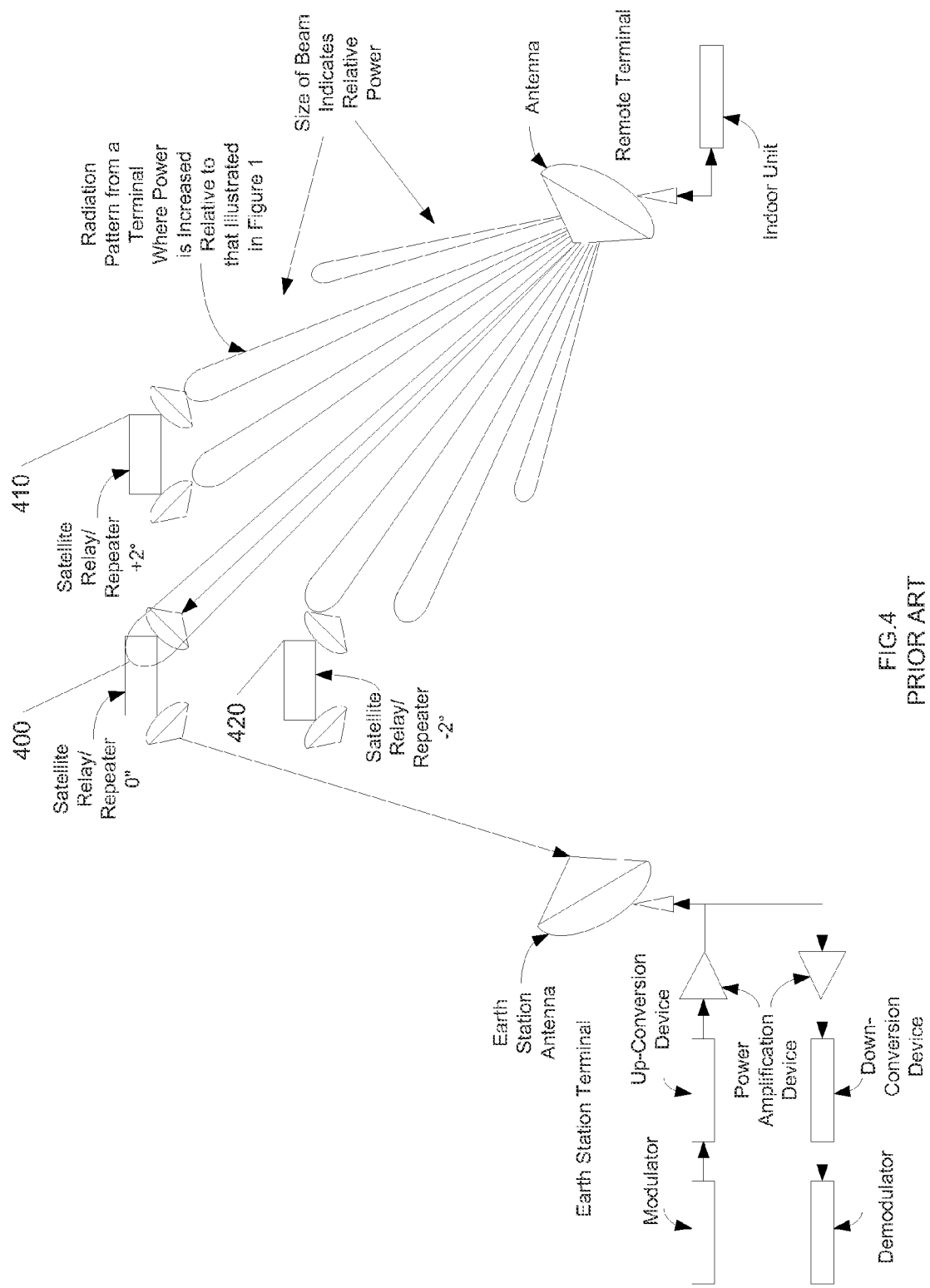
FIG. 4 is representation of emissions from a remote terminal including a corresponding bore-sight and off-axis emissions to a satellite in an orbital arc of the remote terminal.
Figure 5:
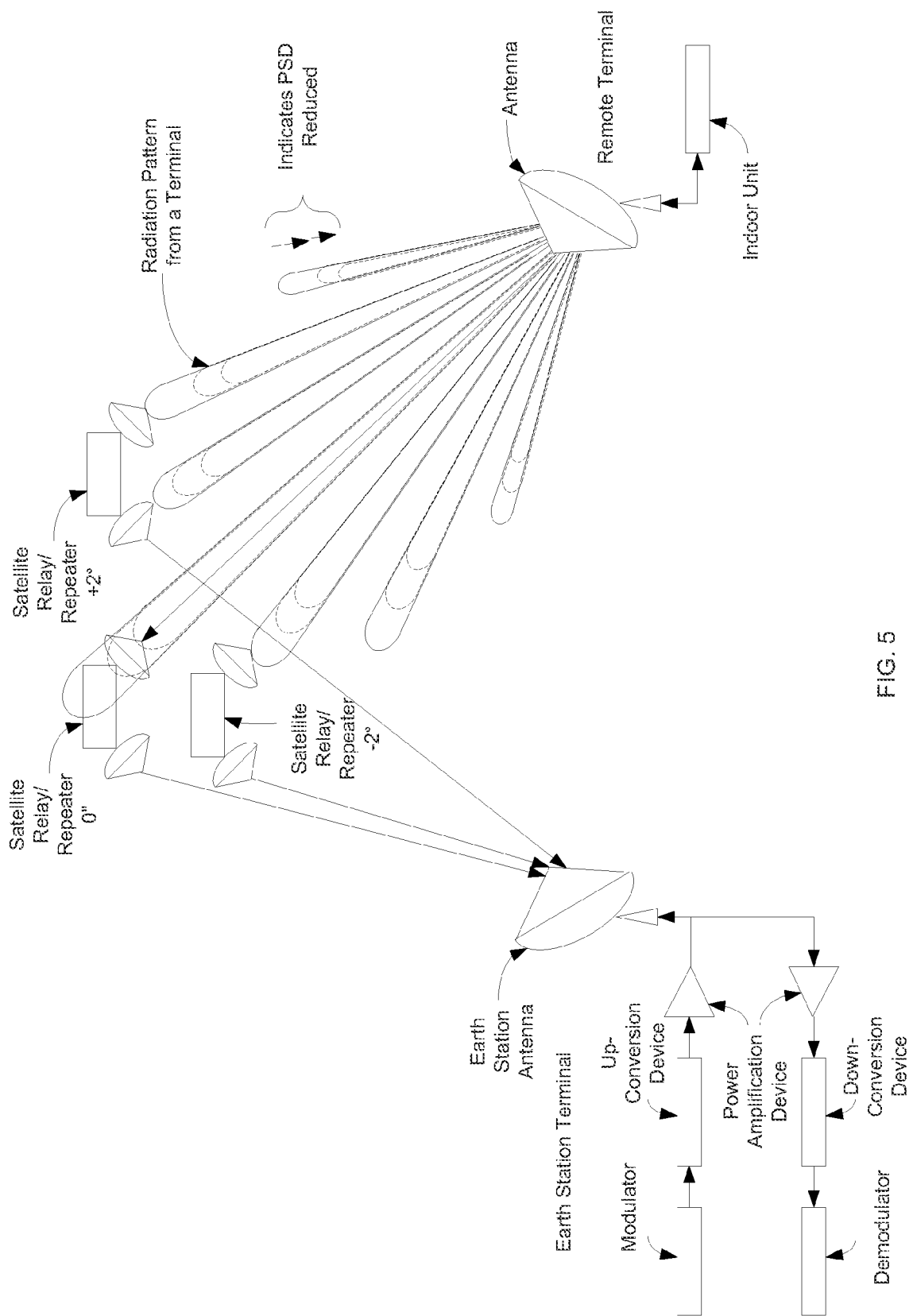
FIG. 5 is a representation of emissions from a remote terminal including a corresponding bore-sight and off-axis emissions to a satellite in the orbital arc in which adjacent satellites are not illuminated.

FIG. 4 shows a typical small antenna where the PSD is being exceeded and the result is that the desired satellite 400 at zero (0) degrees (bore sight) is being illuminated, but the adjacent satellites 410, 420 are being illuminated at a level above an acceptable PSD. In the existing art, the options are to replace the antenna with one or more desirable characteristics, introduce spread spectrum, reduce the power, lower the modulation index, or change the FEC configuration to reduce the PSD. All the described actions result in the carrier signal being interrupted. The result of any or a combination of the possible actions results in the PSD being reduced and the results may be observed in FIG. 5.

Figure 6:
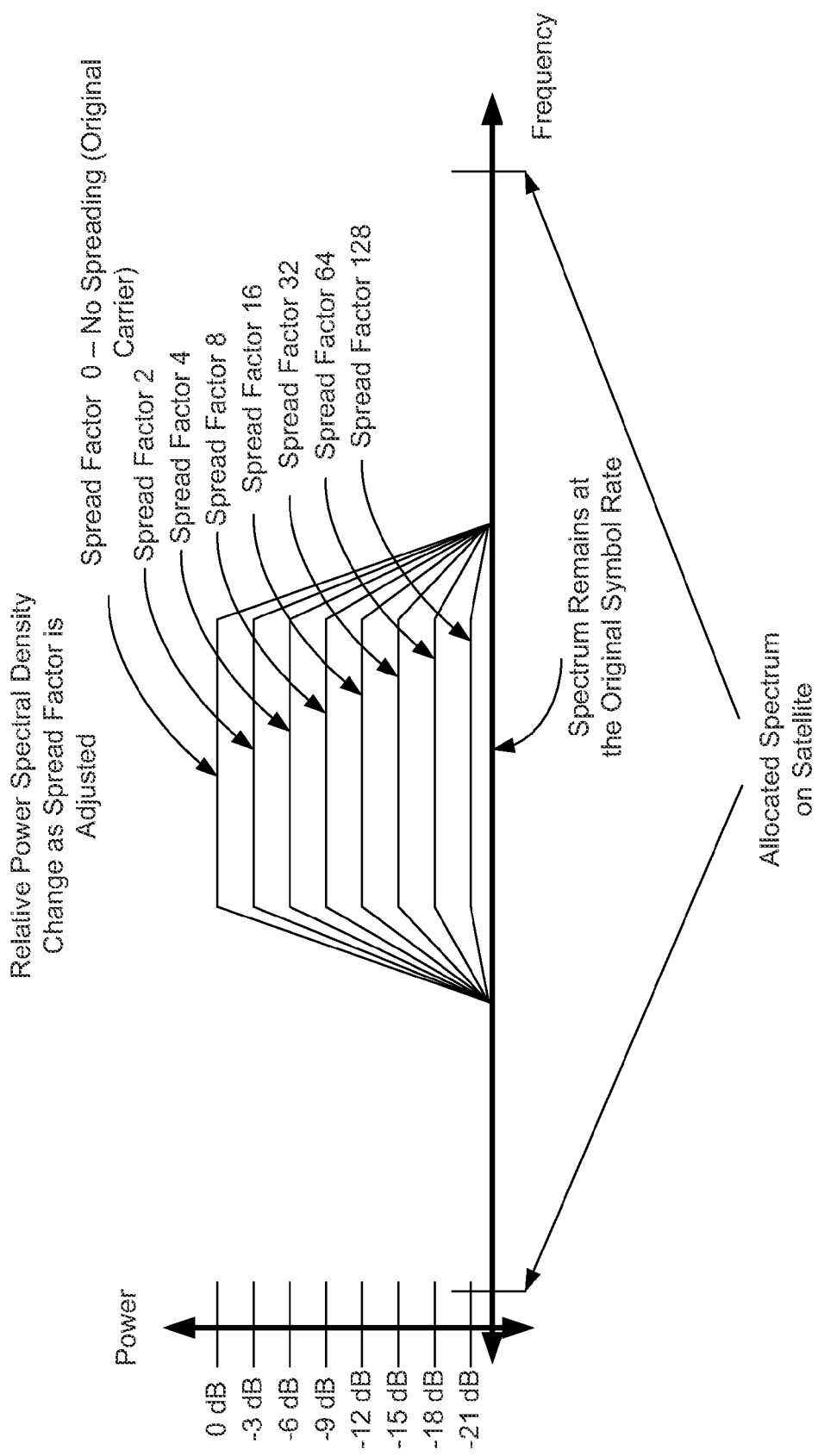
FIG. 6 is a graphical representation depicting an example of occupied bandwidth remaining the same when spreading is introduced and PSD is dynamically lowered.

As shown in FIG. 6, in a particular embodiment of the described method and system, while keeping the occupied bandwidth constant (same as the non-spread symbol rate), spread spectrum may be introduced at the same rate as the symbol rate. The symbol rate, in units of symbols per second (sps), then transitions from sps to a chip rate, in chips per second (cps). The two quantities are the same and remain the same number, but mean something different when transitioning from spread spectrum to non-spread spectrum. In a baseline configuration, the carrier signal may be operating in a non-spread spectrum configuration and if it is deemed the PSD is too high, then while keeping the symbol rate (the rate that symbols are transitioned), a spread spectrum waveform may result by spreading each modulated symbol by a spread factor. Implementations of the method and system may use spread spectrum that uses an integer, non-integer or 2^N type spread factor. Therefore, the nomenclature of a symbol must be removed and replaced by a chip occurring at the same rate as the previous symbol time. By reducing the symbol rate and simultaneously chipping the symbols by the appropriate factor, the result is a constant bandwidth. An aspect of novelty of the method and system is that by holding the occupied bandwidth to a constant value and keeping the chip rate equal to the symbol rate, the complexity of the transmission and receiving equipment is significantly simplified. The result of using implementations of the described method and system may go in and out of spread spectrum and adjust the spread factor on-the-fly without the need of having the carrier signal interrupted as the occupied spectrum remains as a constant value.

Implementations of the described method and system continue to allow the use of power level, modulation index and FEC coding rate to be adjusted as degrees of freedom to change the PSD and the bandwidth available for carrying user data.

Figure 7:
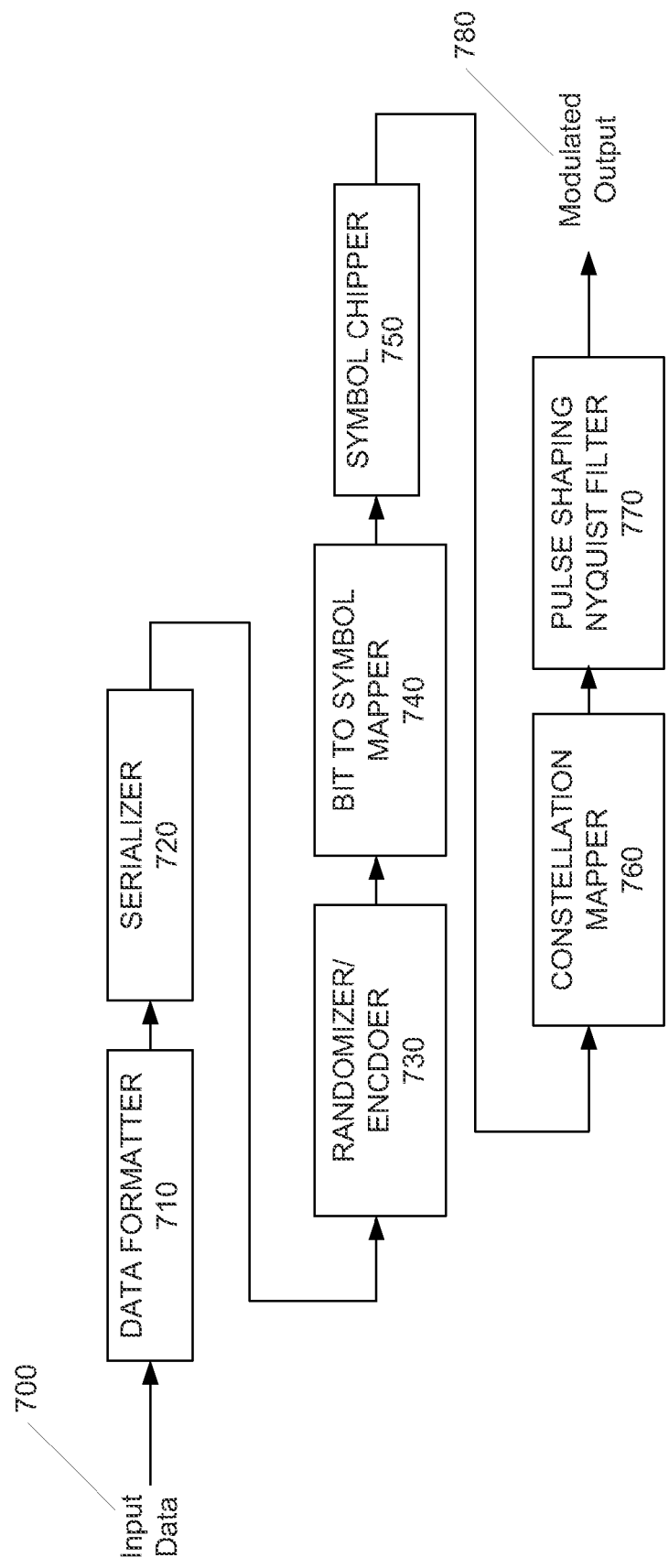
FIG. 7 is a block diagram of a modulator using an implementation of the described method and system.

FIG. 7 shows an implementation of a modulator using an implementation of the described method and system. The modulator comprises a data input 700 that may have a data formatter 710, followed by a parallel to serial serializer 720 followed by a randomizer/encoder 730 for energy dispersal and possible FEC encoding, followed by a bit to symbol mapper 740. Operation up to this point in the modulation flow may be a common modulator in the current art. To implement implementations of the method and system, a symbol chipper 750 may be inserted where each symbol may be chipped. When the carrier signal can meet the PSD limits, the symbol chipper 750 may be set to 0 and the symbols flow through symbol chipper 750 in an unaltered fashion. If the power spectral density is not met, then the symbols may be chipped. The symbol chipper 750 may operate as either an integer chipper (1, 2, 3, 4, etc.), non-integer chipper (1.1, 1.2, 1.3, 1.4, etc.) or as a 2^N chipper. The output of the symbol chipper 750 becomes the standard modulator design flow with a constellation mapper 760, followed by a pulse shaping filter 770, by non-limiting example a Nyquist filter, square root raised cosine filter or other pulse shaping filter, that outputs a modulated output 780 that may also be power amplified and frequency up-converted.

Figure 8:
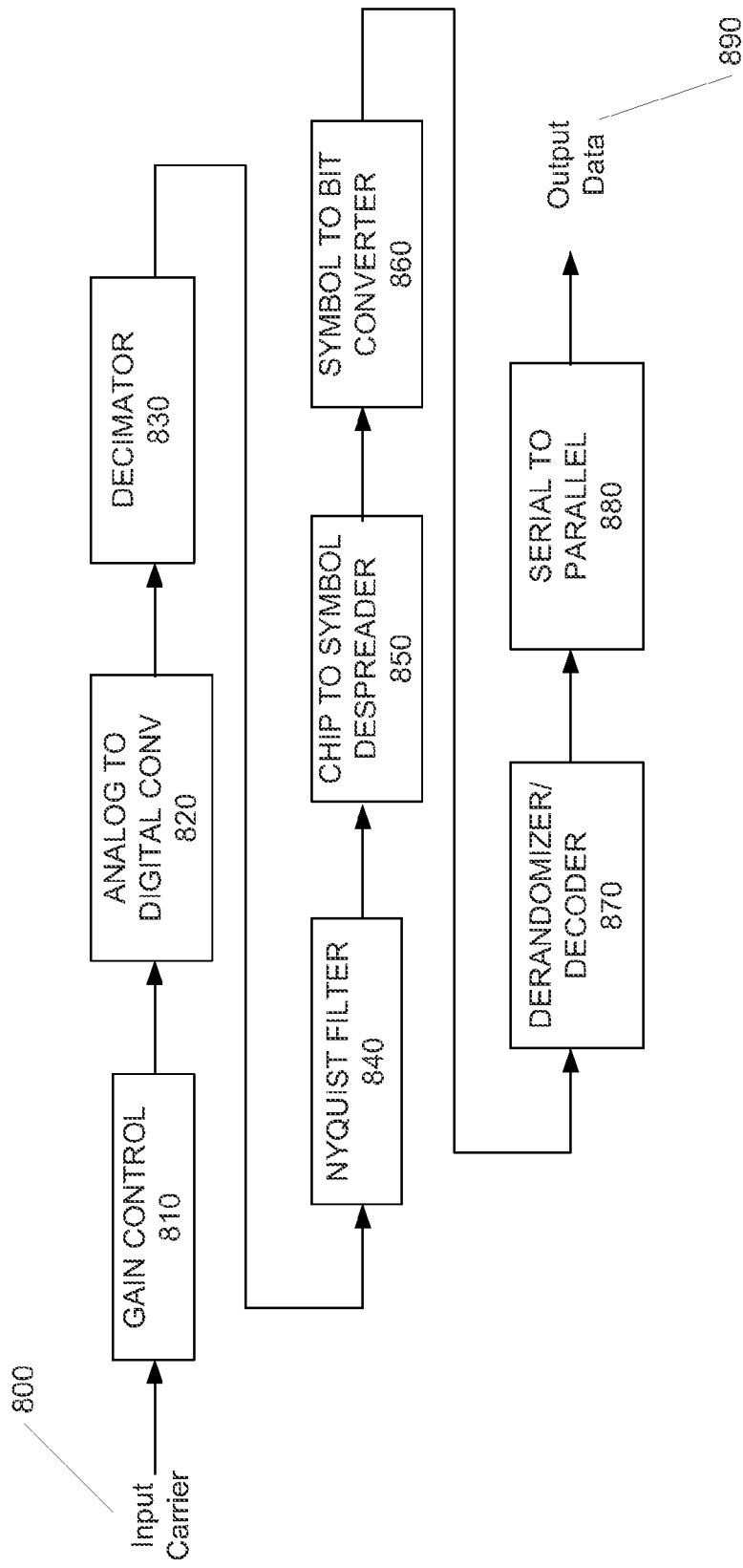
FIG. 8 is a block diagram of a demodulator using an implementation of the described method and system.

FIG. 8 shows an implementation of a demodulator using an implementation of the described method and system. The demodulator comprises a carrier signal input 800 and may include a gain control 810 to set the desired input level, followed by an analog to digital converter (ADC) 820 to convert the input from an analog input to a digital input, followed by a decimator 830 to reduce the input sample rate, followed by a pulse shaped filter filter 840 for smoothing the input samples. Operation up to this point in the demodulation flow may be a common demodulator in the current art. The input then may flow to a chip to symbol despreader 850 where the chips are removed and the carrier signal is reconstituted as a symbol based carrier signal. The output of the chip to symbol despreader 850 becomes the standard demodulator design flow with a symbol to bit converter 860, followed by a de-randomizer/decoder 870 to remove the randomization of the data and possibly a decoder for performing the FEC decoding, followed by a serial to parallel converter 880 and output as a native data stream 890.

The following are particular implementations of a method and system for controlling a communications carrier signal's power spectral density (PSD) using spread spectrum for matched spectral allocation techniques and are provided as non-limiting examples:

Example 1

A satellite network using X-Band is configured to support a mobile site that operates with a 0.45 m antenna. The antenna provides an acceptable level of performance that allows the carrier signal being transmitted from the mobile terminal using 1.0 Msps QPSK 0.780 FEC. The resulting PSD to the adjacent satellites is designed to operate at 1.0 dB below the desired PSD limit. After being placed in service, it is determined the PSD is now 2.0 dB above the required limit when the mobile terminal is in motion. Therefore, the adjacent satellite operators have requested that in conditions at which the PSD is above the acceptable limit, the mobile terminal immediately transitions to a configuration resulting in acceptable PSD operation. Using an implementation of the described method and system, and upon detection of motion, the mobile terminal immediately moves from 1.0 Msps QPSK 0.780 FEC to a spread factor of 2 and the data rate is reduced in half. The resulting carrier signal configuration occupies the same bandwidth but has 3 dB more margin as a result of the change. The power can now be reduced by 3 dB and the link can still be closed. At no time does the mobile terminal using an implementation of the method and system experience a drop in service or require the carrier signal's symbol rate to be reconfigured.

Example 2

In particular implementations of the system described in Example 1, the satellite uses C-Band resulting in the same operation of PSD.

Example 3

In particular implementations of the system described in Example 1, the satellite uses Ku-Band resulting in the same operation of PSD.

Example 4

In particular implementations of the system described in Example 1, the satellite uses Ka-Band resulting in the same operation of PSD.

Example 5

In particular implementations of the system described in Example 1, the satellite uses V-Band resulting in the same operation of PSD.

Example 6

A satellite network using Ku-Band is configured to support a remote site that operates with a 0.2 m antenna. The extremely small antenna provides an acceptable level of performance that allows the carrier signal to be transmitted from the remote site using 48 Ksps BPSK 0.488 FEC. The resulting PSD to the adjacent satellites indicates that carrier signal is operating at the maximum acceptable PSD limit. After being placed in service, it is determined that the PSD is now 9.0 dB above the required limit. Therefore, the adjacent satellite operators have requested that in conditions where the PSD is above the limit, the site must immediately transition to a configuration that results in lower PSD operation. Using an implementation of the described method and system, upon detection by an operator, agency, etc. of being over the PSD limit, the site must be moved from 48 Ksps BPSK 0.488 FEC to a spread factor of 8 and data rate reduced to $\frac{1}{8}$. The resulting carrier signal configuration remains at 48 Kcps BPSK 0.488 FEC and PSD is realized to drop by 9.0 dB. At no time does the site using the method and system experience a drop in service or require the carrier signal's symbol rate to be reconfigured. The site may operate in this manner until the site can be repaired.

Example 7

In particular implementations of the system described in Example 6, the satellite uses C-Band resulting in the same operation of PSD.

Example 8

In particular implementations of the system described in Example 6, the satellite uses X-Band resulting in the same operation of PSD.

Example 9

In particular implementations of the system described in Example 6, the satellite uses Ka-Band resulting in the same operation of PSD.

Example 10

In particular implementations of the system described in Example 6, the satellite uses V-Band resulting in the same operation of PSD.

Example 11

A satellite network using C-Band is configured to support a remote site that operates with a 0.45 m antenna. The extremely small antenna provides an acceptable level of performance that allows the carrier signal to be transmitted from the remote site using 64 Ksps BPSK 0.488 FEC. The resulting PSD to the adjacent satellites appear to be operating at the maximum acceptable PSD limit. After being placed in service, it is determined the PSD is now 10.0 dB above the required limit. Therefore, the adjacent satellite operators have requested that in conditions where the PSD is above the limit, the site must immediately transition to a configuration that results in lower PSD operation. Using an implementation of the described method and system, upon detection by an operator, agency, etc. of being over the PSD limit, the site must be moved from 64 Ksps BPSK 0.488 FEC to a spread factor of 10 and a data rate of $\frac{1}{10}$th. The resulting carrier signal configuration remains at 64 Kcps BPSK 0.488 FEC and PSD is realized to drop by 10.0 dB. At no time does the site using the method and method experience a drop in service or require the carrier signal's symbol rate to be reconfigured. The site may operate in this manner until the site can be repaired.

Example 12

In particular implementations of the system described in Example 11, the satellite uses X-Band resulting in the same operation of PSD.

Example 13

In particular implementations of the system described in Example 11, the satellite uses Ku-Band resulting in the same operation of PSD.

Example 14

In particular implementations of the system described in Example 11, the satellite uses Ka-Band resulting in the same operation of PSD.

Example 15

In particular implementations of the system described in Example 11, the satellite uses V-Band resulting in the same operation of PSD.

Example 16

A satellite network using Ku-Band is configured to support a remote site that operates with a 0.30 m antenna. The extremely small antenna provides an acceptable level of performance that allows the carrier signal to be transmitted from the remote site using 80 Ksps BPSK 0.488 FEC. The resulting PSD to the adjacent satellites appear to be operating at the maximum acceptable PSD limit. After being placed in service, it is determined the PSD is now 3.5 dB above the required limit. Therefore, the adjacent satellite operators have requested that in conditions at which the PSD is above the limit, the site must immediately transition to a configuration that results in lower PSD operation. Using an implementation of the described method and system, upon detection by an operator, agency, etc. of being over the PSD limit, the site must be moved from 80 Ksps BPSK 0.488 FEC to a spread factor of 2.24. The resulting carrier signal configuration remains at 80 Kcps BPSK 0.488 FEC and data rate of 1/(2.24) and PSD is realized to drop by 3.5 dB. At no time does the site using an implementation of the method and system experience a drop in service or require the carrier signal's symbol rate to be reconfigured. The site may operate in this manner until the site can be repaired.

Example 17

In particular implementations of the system described in Example 16, the satellite uses C-Band resulting in the same operation of PSD.

Example 18

In particular implementations of the system described in Example 16, the satellite uses X-Band resulting in the same operation of PSD.

Example 19

In particular implementations of the system described in Example 16, the satellite uses Ka-Band resulting in the same operation of PSD.

Example 20

In particular implementations of the system described in example 16, the satellite uses V-Band resulting in the same operation of PSD.

In places where the description above refers to particular implementations of telecommunications systems and methods, it should be readily apparent that a number of modifications may be made without departing from the spirit thereof and that these implementations may be applied to other telecommunications system and method implementations.

The invention claimed is:

1. A method of reducing adjacent satellite interference, the method comprising:
monitoring, by a processor, a power spectral density (PSD) of a signal transmitted by a remote transmitter, the signal comprising a non-spread waveform;
determining, by the processor, that the PSD of the signal transmitted by the remote transmitter is above a predetermined level;
reducing the PSD of the signal transmitted by the remote transmitter by adjusting at least one of a spread spectrum spreading factor, a modulation factor, and a forward error correction (FEC) rate using a modulator while maintaining a constant spectral allocation and center frequency of the signal;
transitioning the non-spread waveform to a spread waveform wherein the non-spread waveform and the spread waveform have a same spectral allocation; and
applying a spread factor of a type $2^N$ while transitioning the non-spread waveform to a spread waveform.

2. The method of claim 1, further comprising maintaining a communications link between the remote transmitter and a remote receiver while reducing the PSD of the signal.

3. The method of claim 2, further comprising applying one or more predetermined timing parameters by the modulator when more than one of the spread spectrum spreading factor, the modulation factor, and the forward error correction (FEC) rate are adjusted.

4. The method of claim 1, further comprising interrupting a communications link between the remote transmitter and a remote receiver while reducing the PSD of the signal.

5. The method of claim 1, wherein the PSD of the signal is reduced by adjusting only the modulation factor while maintaining a constant spectral allocation and center frequency of the signal.

6. The method of claim 1, wherein the PSD of the signal is reduced by adjusting only the FEC rate while maintaining a constant spectral allocation and center frequency of the signal.

7. The method of claim 1, wherein the PSD of the signal is reduced by adjusting only the modulation factor while maintaining a constant spectral allocation and center frequency of the signal.

8. The method of claim 1, wherein the PSD of the signal is reduced by adjusting only the FEC rate while maintaining a constant spectral allocation and center frequency of the signal.

9. The method of claim 1, further comprising applying an integer spreading spread factor while transitioning the non-spread waveform to a spread waveform.

10. The method of claim 1, further comprising applying a fractional spreading spread factor while transitioning the non-spread waveform to a spread waveform.

11. The method of claim 1, wherein the PSD of the signal is reduced by adjusting only the spread spectrum spreading factor while maintaining a constant spectral allocation and center frequency of the signal.

12. The method of claim 1, wherein the PSD of the signal is reduced by adjusting only the spread spectrum spreading factor while maintaining a constant spectral allocation and center frequency of the signal.

13. A system for reducing adjacent satellite interference, the system comprising:
a remote transmitter configured to transmit a signal comprising a non-spread waveform to a remote receiver;
a processor configured to:
monitor a power spectral density (PSD) of the signal transmitted by the remote transmitter; and
determine that the PSD of the signal transmitted by the remote transmitter is above a predetermined level; and
a modulator configured to:
reduce the PSD of the signal transmitted by the remote transmitter by adjusting at least one of a spread spectrum spreading factor, a modulation factor, and a forward error correction (FEC) rate while maintaining a constant spectral allocation and center frequency of the signal;

transition the non-spread waveform to a spread waveform wherein the non-spread waveform and the spread waveform have a same spectral allocation; and apply a spread factor of a type 2^N while transitioning the non-spread waveform to a spread waveform.

14. The system of claim 13, wherein the modulator is further configured to maintain a communications link between the remote transmitter and the remote receiver while reducing the PSD of the signal.

15. The system of claim 14, wherein the modulator is further configured to apply one or more predetermined timing parameters by the modulator when more than one of the spread spectrum spreading factor, a power level, the modulation factor, and the forward error correction (FEC) rate are adjusted.

16. The system of claim 13, wherein the modulator is further configured to interrupt a communications link between the remote transmitter and a remote receiver while reducing the PSD of the signal.

17. The system of claim 13, wherein the modulator is further configured to reduce the PSD of the signal is by adjusting only the modulation factor while maintaining a constant spectral allocation and center frequency of the signal.

18. The system of claim 13, wherein the modulator is further configured to reduce the PSD of the signal by adjusting only the FEC rate while maintaining a constant spectral allocation and center frequency of the signal.

19. The system of claim 13, wherein the modulator is further configured to reduce the PSD of the signal by adjusting only the modulation factor while maintaining a constant spectral allocation and center frequency of the signal.

20. The system of claim 13, wherein the modulator is further configured to reduce the PSD of the signal by adjusting only the FEC rate while maintaining a constant spectral allocation and center frequency of the signal.

21. The system of claim 13, wherein the modulator is further configured to apply an integer spreading spread factor while transitioning the non-spread waveform to a spread waveform.

22. The system of claim 13, wherein the modulator is further configured to apply a fractional spreading spread factor while transitioning the non-spread waveform to a spread waveform.

23. The system of claim 13, wherein the modulator is further configured to reduce the PSD of the signal by adjusting only the spread spectrum spreading factor while maintaining a constant spectral allocation and center frequency of the signal.

24. The system of claim 13, wherein the modulator is further configured to reduce the PSD of the signal by adjusting only the spread spectrum spreading factor while maintaining a constant spectral allocation and center frequency of the signal.

* * * * *